March 14, 1950 E. A. KRAUTH 2,500,638
AID FOR THE BLIND

Filed April 26, 1946 3 Sheets-Sheet 2

INVENTOR
E. A. KRAUTH
BY
ATTORNEY

March 14, 1950     E. A. KRAUTH     2,500,638
AID FOR THE BLIND

Filed April 26, 1946     3 Sheets-Sheet 3

INVENTOR
E. A. KRAUTH
BY
ATTORNEY

Patented Mar. 14, 1950

2,500,638

UNITED STATES PATENT OFFICE 2,500,638

AID FOR THE BLIND

Edwin A. Krauth, New York, N. Y., assignor to Bell Telephone Laboratories, Incorporated, New York, N. Y., a corporation of New York Application April 26, 1946, Serial No. 665,122

5 Claims. (Cl. 177—352)

The present invention relates to sound wave apparatus, and more particularly to such apparatus operating at supersonic frequencies adapted for use by the blind as a portable aid to locomotion.

It has long been the practice for blind persons to detect large objects in their immediate vicinity by "echoes" or sound waves reflected from the surface of the object. In some instances the tapping of a walking stick upon the pavement has served as the sound source.

Because of the variety of confusing audible frequency sounds normally present in most locations, and also because of the non-directional characteristic of most low frequency sound sources, it is apparent that a highly directional source of individually characterized sound would present a considerable improvement over the former method.

In general, this invention constitutes an energy transmitting and receiving system arranged to emit controllable pulses of supersonic wave energy in a directional pattern in air, to receive the portion of this energy which is reflected from nearby surfaces and convert such reflected energy into controllable audible signals.

It is an object of the invention to make such a system of such weight and size that it may be conveniently worn and carried by the user as an aid in locomotion.

In measuring distance by the echo timing method, it is requisite that there be a sufficient time interval between outgoing transmissions to permit the "echo" or reflected energy to be returned. It is also highly desirable to make as many energy transmissions per unit of time as conditions permit in order to facilitate the use of the apparatus.

It is a further object of the invention to adapt such a system for a variety of distances, by making adjustable the number of transmissions in any time interval.

It is also an object of the invention to present to the user a signal that changes in pitch as the distance to the reflecting object varies.

Figure 1:
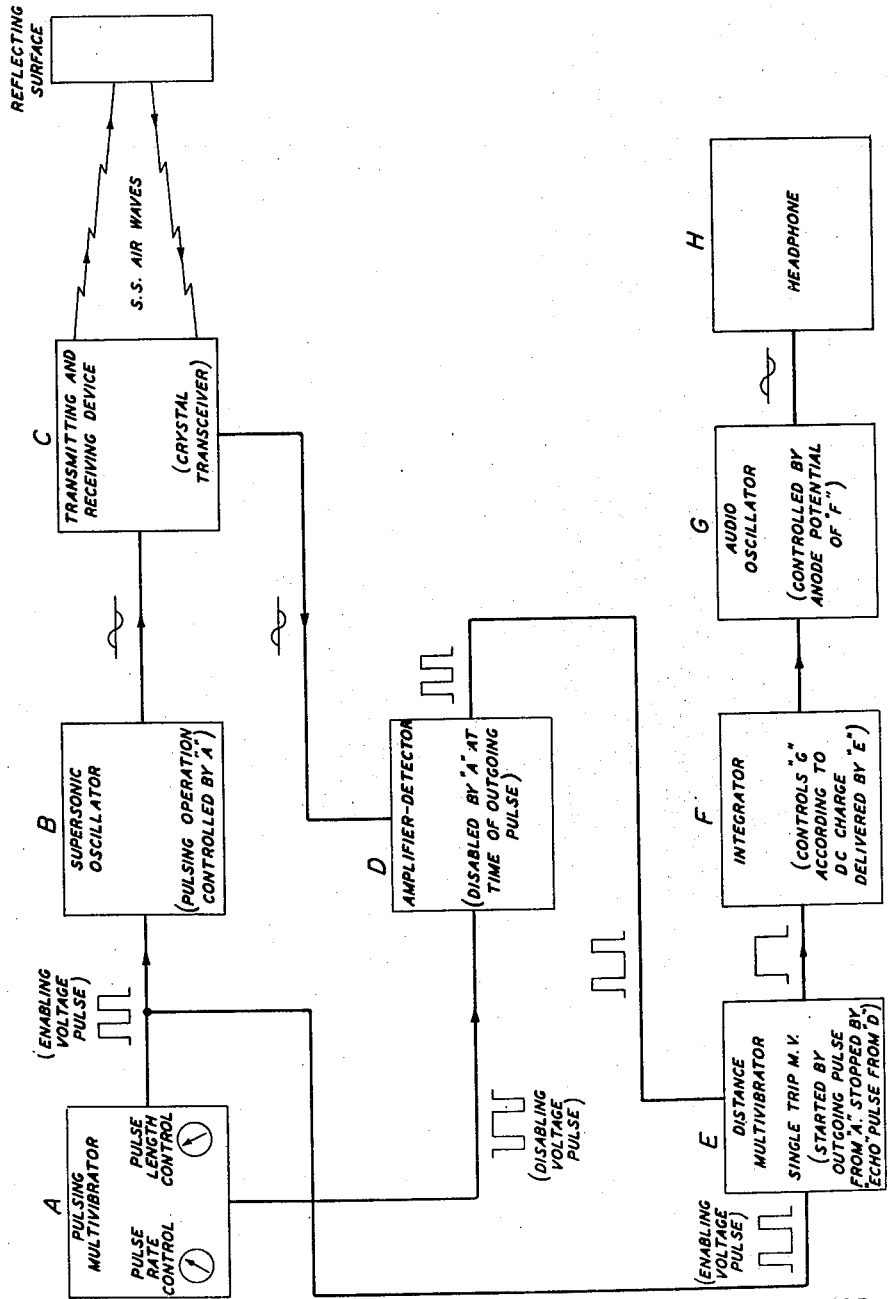
Figure 2:
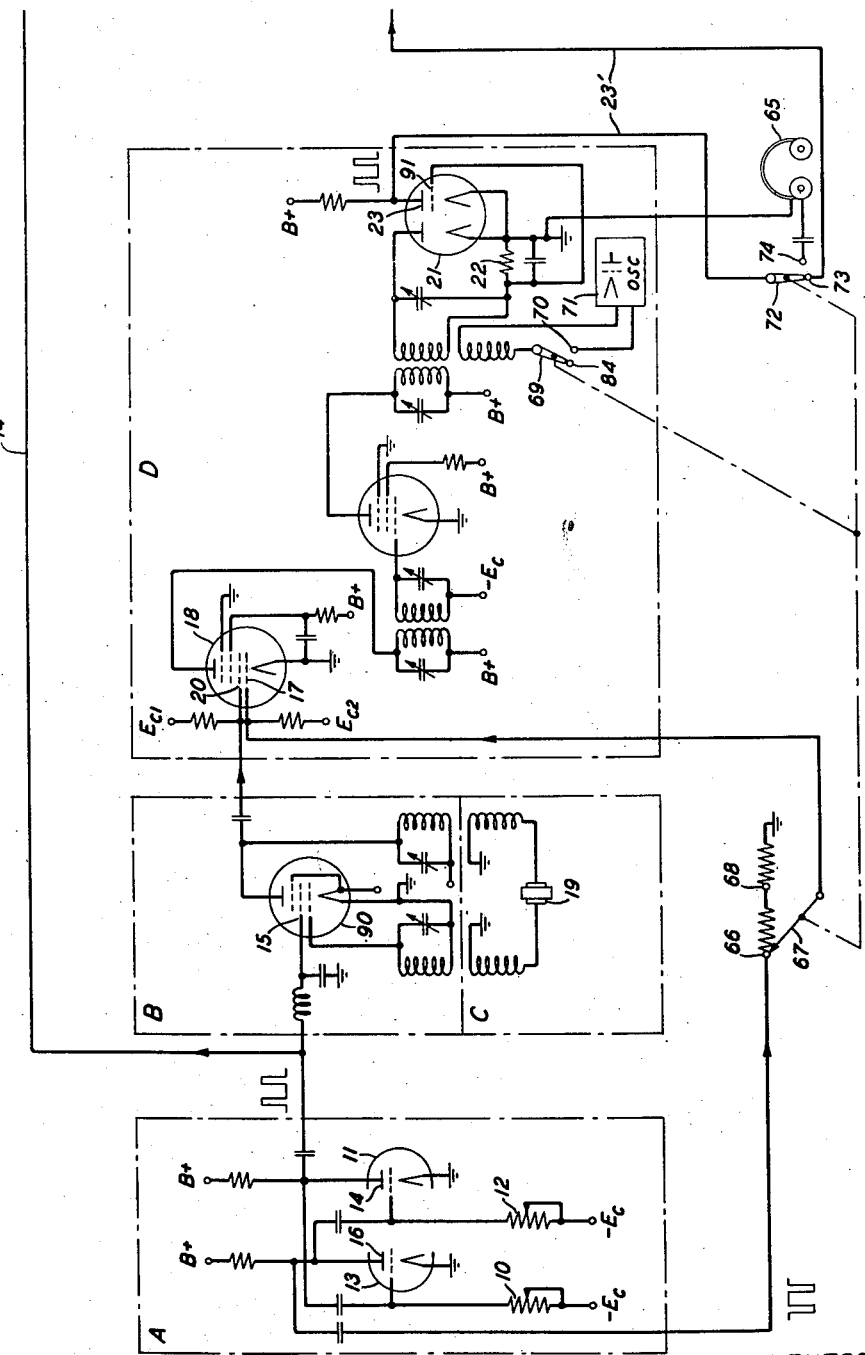
Figure 3:
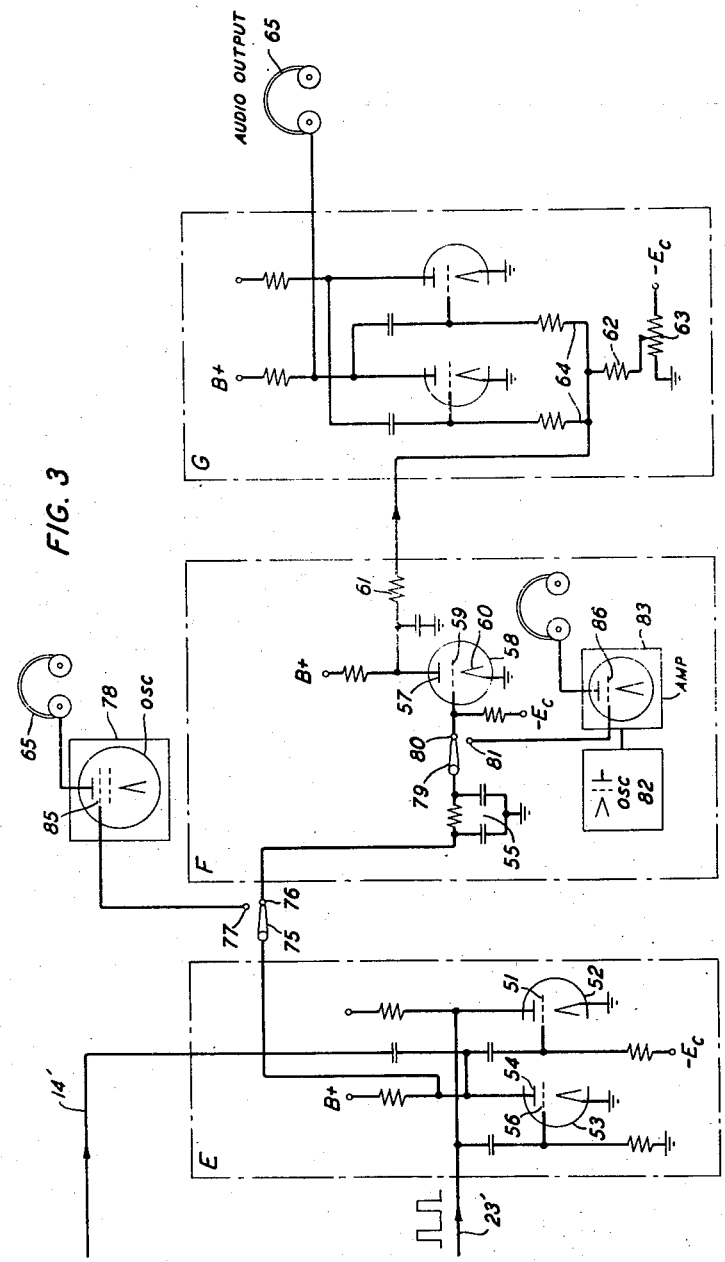

A more complete understanding of the invention, together with its various objects and features, may be had from the following detailed description when considered in connection with the accompanying drawing, in which:

Fig. 1 presents a block schematic of the invention;

Fig. 2 presents in schematic form the energy transmitting and receiving branch of the system; and Fig. 3 presents in schematic representation the distance measuring and signal generating branch of the system.

The general plan of such a transmitting and receiving system is as indicated in Fig. 1, in which the units A, B, C and D function as devices for transmitting and receiving supersonic energy and form a device for the detection of unseen objects. The units E, F and G perform the measuring function and present an audible signal that varies in proportion to the distance. The pulsing multivibrator A exerts a control function on the transmitting, receiving and distance measuring units. The crystal transceiver C transmits outgoing energy received from the supersonic oscillator B and receives the reflected energy which it delivers to the amplifier-detector D for amplification and conversion into a square wave control pulse. The integrator F receives a voltage charge from the distance multivibrator E which charge is directly proportional to the elapsed time between the outgoing transmission and the receipt by the distance multivibrator E of the control pulse from the amplifier detector D. The integrator F, acting under the influence of its voltage charge, controls the frequency of the multivibrator type audio oscillator G in such manner that a change in its pitch or frequency is observed as the distance from the crystal transceiver to the reflecting surface is varied. Because relatively small changes in frequency or pitch are generally more readily recognizable than proportionately sized changes in intensity or duration of an audible signal, the presented embodiment of the invention makes use of this principle.

The different units of the system, as represented in general diagram in Fig. 1, are shown in detail in Figs. 2 and 3, with Fig. 2 being placed to the left of Fig. 3. It is not deemed necessary to describe these circuits in detail, except as the operational steps are traced in describing the manner of operation and use of the system.

Referring to Figs. 2 and 3, assume the pulsing multivibrator A to be oscillating at a frequency determined by the setting of its adjustable pulse rate control 10 and to be generating in the triode section 11 a control pulse of duration determined by the adjustable pulse length control 12. At the instant the triode section 11 changes over from a conducting to non-conducting state, the voltage of anode 14 rises sharply and the conjugate triode section 13 reverses its conductive relation, thereby experiencing a sharp drop in voltage at its anode 16. These voltage changes are available as positive and negative control voltage pulses, respectively. The positive pulse obtained at the triode anode 14 is applied to the screen grid 15 of the oscillator pentode vacuum tube 90 to initiate the outgoing energy transmission. Circuit voltages of this oscillator are designed such that oscillations occur only when this screen grid is at a definite positive potential. This same pulse is also applied to the grid 51 of the unstable or normally non-conducting triode section 52 of the single trip distance multivibrator E (Fig. 3) over lead 14', thereby forcing this element to conduct current. This action renders its conjugate triode section 53 non-conductive with a consequent increase in voltage at its anode 54. This voltage increase initiates the charge to the capacitive resistive element 55 of the integrator unit F, switch 75 being in the position shown. The charging operation will continue until the distance multivibrator is restored to its original stable position by a positive voltage pulse derived from the reflected energy or by the normal reversing action incident to its natural period of oscillation.

Simultaneously with the above operations, the triode section 13 of pulsing multivibrator A delivers a negative voltage pulse at its anode 16, which pulse is applied through the contact 66 and switch 67, as shown, to the first grid 17 of the vacuum tube 18 in the amplifier-detector unit D. This negative charge disables this unit for any input currents so that no voltage pulses are delivered from this unit to the remainder of the circuit.

The oscillator unit B generates electric wave oscillations which excite the crystal element 19 of the transmitter-receiver unit C to mechanically vibrate at the same supersonic frequency. Oscillators of this type were destcribed by W. P. Mason and I. E. Fair in the October 1942 Proc. I. R. E. in an article entitled "Crystal control for ultra-short waves." The transmitter-receiver unit C makes use of crystal elements having piezoelectric properties as the moving element to generate pressure waves. Such crystal elements are well known in the art and may be composed of quartz, Rochelle salts or similar materials. Vibration of the crystal element 19 generates waves of compression and rarefaction of the air in the manner well known in the art. These waves move outwardly, according to the energy distribution pattern of the transmitter, until they encounter a reflecting surface and are reflected back to the transmitting unit.

When the current conduction relations in the pulsing multivibrator A are reversed at a time determined by the pulse length control 12, the positive and negative control voltage pulses are removed. The supersonic generator ceases oscillating and the vacuum tube 18 of the amplifier-detector D is restored to an operative state receptive to the reflected energy which may presently appear. However, because of the choice of circuit elements in the distance multivibrator E, the triode element 52 is not restored to its original state and continues to conduct, thereby continuing to charge the integrator F from the high voltage source at the anode 54.

The reflected energy acting through the piezoelectric property of the crystal element 19 of the transmitter-receiver unit C creates electric wave energy which is applied to the second grid 20 of the vacuum tube 18 of the amplifier-detector unit D. This energy is amplified and is then rectified in the diode half of the vacuum tube 21 where it appears as negative voltage pulses across the load resistor 22. These negative pulses when applied to the grid 91 control the normally conductive triode portion of the vacuum tube 21, making this element non-conductive with an attendant sharp rise in voltage at its anode 23. The leading edge of this anode voltage rise corresponds with the return of the reflected energy and is available as a control pulse to halt the distance multivibrator unit E in its distance measuring function.

The positive voltage control pulse obtained at the anode 23 is applied to the distance multivibrator control grid 56 over lead 23' forcing the triode element 53 to start conducting current, with an attendant sharp voltage drop at its anode 54. This action terminates the charging voltage that, since the start of the energy transmission, has been charging the capacitive-resistive element 55 of the integrator unit F. It will be noted that the charge that is delivered to the integrator varies directly as the period required for the energy wave to travel out to the unseen object and return to the transmitter. This charge may therefore be used to measure the distance to the object.

The voltage at the anode 57 of the integrator vacuum tube 58 is controlled by the grid-cathode 59—60 voltage relation, as determined by the charge contained in the capacitor-resistor combination 55. This anode 57 forms one terminal of the voltage divider composed of resistor 61, 62, 63. Its voltage determines the total voltage drop across the divider circuit and controls the audio frequency of the multivibrator oscillator G by controlling its grid return voltage available at point 64. As the anode 57 voltage is directly related to the elapsed time between the outgoing energy transmission and the receipt, if any, of the reflected energy, and this voltage controls the frequency of the multivibrator oscillator G, it follows that the pitch of the signal heard in the headphones 65 will vary as this time is varied.

In preparing the apparatus for use, the tone pitch corresponding to zero distance is selected by holding the transmitter-receiver C near a reflecting surface and positioning adjustable resistance 63 until a suitable tone is observed.

One of the circuit elements of the pulsing multivibrator A is a pulse rate control 10, by means of which the number of energy transmissions per second may be controlled. Therefore, the previously described sequence of operations will be repeated as often as there are transmissions per second. In the present embodiment this value ranges from one to ten. However, this quantity is not restrictive as the only criterion is the speed of propagation of the supersonic wave in air, which is approximately 1100 feet per second. It is evident that the period between pulses must be sufficiently long to permit the desired reflected energy to be received before the next outgoing transmission.

In the described embodiment, the variation in distance between the apparatus user and the reflecting surface is presented as a signal of changing pitch or frequency. This presentation has the advantage that the normal ear is more sensitive to small changes in pitch than to proportionate changes in intensity or duration. It is possible that special circumstances might make it advisable to present the information in other fashions, and arrangements for so doing are shown as alternate means controlled by switch operations.

Where it is desired that the signal be presented as a time separation between two audible signals, such as would occur where the user observes a signal at the time the energy is projected, and observes a second signal when the reflected energy is received, the described circuit may be altered as follows. The switch which mechanically links brushes 67, 69 and 72 is manually positioned so that connection is made between brush 67 and contact 68, brush 69 and contact 70, and brush 72 and contact 74. The amplitude of the negative pulse derived at contact 68 is reduced from the amplitude of the pulse available at the anode 16. This reduction is of an amount such that the pulse, when applied to the grid 17, merely reduces the gain of tube 18 and permits a small amount of energy in the transmitting circuit to pass. Brush 69 and contact 70 connect an oscillator 71 in the input of the detector tube 21 to permit mixing its output with the energy received from the transmitting circuit. The oscillator 71 is of conventional design and differs in frequency from the transmitting oscillator by any predetermined amount so as to give an audible heterodyne frequency. Brush 72 and contact 74 transfer the output 23' of vacuum tube 21 to the headphones 65 that bridge from the anode 23 to cathode ground. The diode section of tube 21 rectifies the heterodyne frequency and by controlling the conductivity of the triode section of tube 21 delivers an audible signal to the headphones 65. At such time as the reflected energy is received it is amplified, heterodyned and detected to repeat the operation and give an audible signal corresponding to the echo or reflected energy. The time interval between signals is proportional to the distance to the reflecting surface.

Where it is desired that the distance to the reflecting surface be portrayed by the duration of the audible signal, the switch may be returned to its normal position so that brushes 67, 69 and 72 connected with contacts 66, 84 and 73, respectively. Brush 75, between the multivibrator E and the integrator F, is operated to engage contact 77 so that the voltage at the anode 54 controls the oscillation of the audio frequency oscillator 78 which, like the transmitting oscillator B, requires a positive potential of a definitely determined value on its screen grid 85 to be in an oscillatory condition. At the time of the outgoing transmission, the voltage at the anode 54 rises due to the triode section 53 becoming non-conductive, as previously explained. This positive voltage is applied to the grid 85 of the oscillator 78 through brush 75 and contact 77 and starts the oscillator to generating an audible frequency signal. This signal continues until the received reflected energy causes the restoration of the distance multivibrator E, as previously explained, and the consequent lowering of the voltage at the anode 54 and the grid 85 arrests oscillation. The duration of the audible signal is varied directly as the distance to the reflecting surface changes.

Similarly, if it is preferred that the distance indication be related to the intensity of the observed signal, the brush 75 may be returned to contact 76, thereby returning the integrator F to the circuit arrangement, and operating brush 79 to engage contact 81, thus placing the grid 86 of the audio frequency amplifier 83 under control of the charge delivered to the capacitive resistive element 55 of the integrator F. Audio frequency oscillator 82 and the audio frequency amplifier 83 are of conventional design well known in the electronic art. The oscillator output is amplified in the amplifier 83 with the degree of amplification under control of the potential of its grid 86. As this grid potential is derived from the operation of the distance multivibrator which operation is related to the distance to the reflecting surface, it follows that the signal intensity observed in the headphones 65 will vary as this distance is varied.

Various modifications of the circuits shown and described which are within the scope of this invention will doubtlessly occur to persons skilled in the art.

What is claimed is:

1. A portable aid for the blind comprising a source of supersonic electric wave energy, an oscillatory source of voltage pulses connected thereto whereby said energy source is periodically activated and deactivated, unitary means connected to said source for directionally projecting pulses of supersonic wave energy and for receiving portions of said energy reflected from a distant object, means for converting the output of said receiving device into control signals, oscillatory means variable in response to said control signals for generating continuous and variable audio frequency electric waves, and translating means for converting said generated electric waves into sound waves.

2. A portable aid for the blind comprising a source of electric wave energy, a capacitive network and directly connected thereto a source of electric current, oscillatory means for activating said source of electric wave energy and at the same time initiating current flow between said current source and said network, a directional transmitting and receiving unit for at one instant transmitting said electric wave energy as pulses of conpressional waves and at a later instant receiving portions of said energy which are reflected from a distant object, means for deriving from each such pulse of said received reflected energy a substantially flat-topped control voltage pulse, means responsive to said control pulse for altering the current flow between said electric source and said network, a source of audio frequency electric oscillations and associated therewith a translating device for converting said electric oscillations into audible sound waves, and means responsive to the current charge acquired by said capacitive network in the time interval between said transmitted pulse of energy and said derived control pulse for controlling the frequency of the oscillations derived from said source of audio frequency electric oscillations.

3. A portable aid for the blind comprising means for intermittently generating supersonic frequency electric wave energy, directional means for at one instant transmitting a pulse of said energy as compressional wave energy and at a later instant receiving reflected portions of said transmitted energy reflected from a distant object, means for deriving from said received reflected energy a control impulse, means for generating continuous and variable audio frequency electric waves, said means being responsive to said derived control impulse for controlling the magnitude of said generated waves in accordance with the elapsed time between the transmission of said energy pulse and the receipt of said reflected energy, and translating means for converting said generated waves into audible sound waves the magnitude of which is related to the distance to the reflecting object.

4. A portable aid for the blind comprising a source of supersonic electric wave energy, a variable frequency multivibrator oscillator connected thereto and adapted to intermittently activate and deactivate such energy source at regularly recurring intervals, amplifying and detecting means, unitary means connected to said source and said amplifying and detecting means for directionally projecting pulses of said energy and for receiving reflected portions of said projected energy, a source of electromotive force and a capacitive network connected directly thereto, means responsive to said variable multivibrator oscillator for initiating the charging of said network from said source, and responsive to the output of said amplifying and detecting means for terminating said charging of said network, an audio frequency oscillator and means directly connected thereto and to said capacitive network for controlling the frequency of oscillation of said oscillator in accordance with the instantaneous magnitude of the electric charge in said network, and a receiver for translating the output of said oscillator into audible frequency sound waves.

5. A portable aid for the blind comprising a source of supersonic electric wave energy, a variable frequency multivibrator oscillator connected thereto and adapted to intermittently activate and deactivate said energy source at regularly recurring intervals, unitary means connected to said source for directly projecting pulses of said energy and for receiving reflected portions of said projected energy, detecting means connected to said unitary means for converting each pulse of said received energy into a unidirectional control voltage pulse, a single-trip multivibrator and a capacitive network connected to the normally conducting anode of said multivibrator, means interconnecting said variable multivibrator and said single-trip multivibrator whereby the potential of said normally conducting anode is increased at the same time that said source of supersonic energy is activated, means responsive to said unidirectional control voltage pulse for lowering the potential of said normally conducting anode to its former value, an audio frequency oscillator and means connected thereto and to said capacitive network for controlling the frequency of said oscillator in accordance with the instantaneous electric charge in said capacitive network, and a receiving device for translating said electric oscillations into audible frequency sound waves.

EDWIN A. KRAUTH.

REFERENCES CITED

The following references are of record in the file of this patent:

UNITED STATES PATENTS

| Number | Name | Date |
| --- | --- | --- |
| 1,692,119 | Hayes | Nov. 20, 1928 |
| 1,718,422 | Kunze | June 25, 1929 |
| 1,973,673 | Rice | Sept. 11, 1934 |
| 2,083,344 | Newhouse et al. | June 8, 1937 |
| 2,098,266 | Walker | Nov. 9, 1937 |
| 2,144,843 | Hearne | Jan. 24, 1939 |
| 2,338,395 | Bartelink | Jan. 4, 1944 |
| 2,371,988 | Granqvist | Mar. 20, 1945 |
| 2,395,368 | Bull | Feb. 19, 1946 |
| 2,405,134 | Brown et al. | Aug. 6, 1946 |
| 2,428,424 | Landon | Oct. 7, 1947 |